United States Patent [19]

Crinkelmeyer et al.

[11] 4,102,400

[45] Jul. 25, 1978

[54] METHOD OF CONTROLLING FLUID LOSS FROM THIXOTROPIC CEMENT

[75] Inventors: Oliver W. Crinkelmeyer, Kilgore, Tex.; Roland L. Root, Tulsa, Okla.; James R. Sharpe, Houston, Tex.

[73] Assignee: The Dow Chemical Company, Midland, Mich.

[21] Appl. No.: 807,763

[22] Filed: Jun. 17, 1977

[51] Int. Cl.$^2$ .................. E21B 33/16; E21B 33/138
[52] U.S. Cl. ............................... 166/283; 166/291
[58] Field of Search .................. 166/283, 291, 292

[56] References Cited

U.S. PATENT DOCUMENTS

| | | | |
|---|---|---|---|
| 2,848,051 | 8/1958 | Williams | 166/291 |
| 3,390,723 | 7/1968 | Hower et al. | 166/292 |
| 3,408,296 | 10/1968 | Kuhn et al. | 166/283 X |
| 3,411,582 | 11/1968 | Dale | 166/292 |
| 3,467,193 | 9/1969 | Messenger | 166/292 |
| 3,563,313 | 2/1971 | Spangle | 166/292 |
| 3,625,286 | 12/1971 | Parker | 166/291 |
| 3,753,903 | 8/1973 | Fischer et al. | 166/283 X |
| 3,989,632 | 11/1976 | Fischer et al. | 166/283 X |

FOREIGN PATENT DOCUMENTS

| | | |
|---|---|---|
| 292,794 | 5/1968 | Australia. |
| 733,033 | 4/1966 | Canada. |

Primary Examiner—Stephen J. Novosad
Assistant Examiner—George A. Suchfield
Attorney, Agent, or Firm—Glenn H. Korfhage

[57] ABSTRACT

In cementing a well with a thixotropic cement, such as with the portland cement/$CaSO_4 \cdot \frac{1}{2}H_2O$/water slurry described in U.S. Pat. No. 3,563,313, an effective means for controlling fluid loss from the slurry is to precede the slurry with a fluid comprising water, a water soluble alkali metal compound capable of releasing a multivalent metal cation to react with the soluble silicate to form a pumpable gel, and a water dispersible cellulose compound and an inert particulate which together impart fluid loss control to the fluid. Optionally, the fluid may contain one or more of: a chelating agent for polyvalent metal cations; a weighing material; a material to minimize lost circulation, and a salt to stabilize fresh water sensitive sandstones and shales, e.g., those having a high clay content.

19 Claims, No Drawings

METHOD OF CONTROLLING FLUID LOSS FROM THIXOTROPIC CEMENT

BACKGROUND OF THE INVENTION

1. Field of the Invention

The invention relates to a method of controlling fluid loss from a thixotropic cement slurry of the type used in cementing conduit in a wellbore.

2. Description of the Prior Art

Thixotropic cement slurries have been used in cementing wells for a number of years, particularly on wells where lost circulation is likely to be a problem. Among those thixotropic cement systems which have enjoyed the most commercial success is that disclosed by Spangle in U.S. Pat. No. 3,563,313, the teachings of which are expressly incorporated herein.

A chronic problem with such slurries, however, is that such slurries have a high degree of fluid loss. This problem is recognized, for example, in SPE Paper 6011. At column 2, line 3 of Spangle, it is suggested that fluid loss control compositions may be used in the thixotropic cement composition there described. However, although a slight measure of fluid loss control can be imparted to the slurry itself using some convention additives, the potential problems are such that such an approach is not commercially practical. For example, cellulose gums incorporated in the slurry provide a slight measure of fluid loss control, but are also somewhat detrimental to the thixotropic properties of the cement, to the extent that they do not provide a commercially practical solution to the problem. Thus, a slurry comprised of Class A portland cement, and, by weight of cement, 12% $CaSO_4.\frac{1}{2}H_2O$, 0.4% hydroxyethylcellulose, 60% water, and 3% calcium chloride flake (assay 77–80% $CaCl_2$) had an API fluid loss of 230 ml/min at 80° F and 1000 psi. Larger amounts of hydroxyethylcellulose substantially destroyed the thixotropic properties of the slurry. Polyamines and polyalkylenepolyamines are not themselves harmful to the thixotropic properties of the cement, but are effective fluid loss control agents only when used in combination with a dispersant (U.S. Pat. No. 3,491,049), and the dispersant destroys the thixotropic properties of the slurry. Accordingly, the need for a suitable means for controlling fluid loss from such cement slurries has persisted.

In commonly assigned application Ser. No. 766,835 filed Feb. 7, 1977 by Thomas J. Griffin, Jr., and Larry K. Moran there is disclosed a spacer composition which, in a preferred embodiment, is that employed in the present invention. It was the present applicants, however, who first recognized that said spacer could be used to control fluid loss from a thixotropic cement slurry.

SUMMARY OF THE INVENTION

The present invention is a method of controlling fluid loss from a thixotropic cement slurry, which itself is substantially free of an effective amount of a fluid loss additive, during emplacement of such a slurry in a borehole. The crux of the invention lies in providing a fluid comprised of water, a water soluble alkali metal silicate, a water soluble metal compound capable of releasing a multivalent metal cation to react with the water soluble silicate, and a water dispersible cellulose compound and an inert particulate which together impart fluid loss control to the fluid. The fluid components are provided in amounts effective to form a pumpable gel. In carrying out the method, a conduit to be cemented in place, such as casing, tubing, a liner, and the like, is temporarily positioned in the borehole in a conventional manner. The fluid is injected into said borehole so that at least a portion of the fluid contacts the walls of the formation where fluid loss would be likely to occur. The thixotropic cement slurry is then injected and circulated into position, where it is permitted to gel and eventually set, thereby permanently cementing the conduit into position. A sufficient quantity of the fluid is injected prior to the cement slurry so that fluid loss of the cement slurry to the formation is reduced.

DEFINITIONS

The fluid hereinabove summarily described which precedes the thixotropic cement slurry according to the present invention is sometimes hereinafter referred to as a "spacer," since the fluid is frequently used ahead of the cement to displace the drilling mud from the borehole, as well as to simultaneously provide fluid loss control for the cement slurry to follow. However, it is to be understood that the spacer can also be used to provide fluid loss control for the cement slurry according to the present invention even though the borehole does not initially contain drilling mud, such as may be the case where the borehole has been air drilled, or where the mud has been removed by other means.

As the phrase is used herein, a thixotropic cement slurry is deemed to be "substantially free of an effective amount of a fluid loss additive"—even though said slurry may contain a small amount of a composition which imparts some fluid loss control to the slurry—if the slurry itself has a fluid loss at 80° C and 1000 psi of at least 200 ml/30 minutes, when tested according to the procedure specified in API Bulletin RP10B, Section 8.2.4.

The abbreviation "BWOW" as used herein and in the appended claims means "by weight of water."

FURTHER DESCRIPTION OF THE INVENTION

A. Thixotropic Cement

The thixotropic cement slurry employed in the present invention is preferably that described in U.S. Pat. No. 3,563,313, the teachings of which are expressly incorporated herein. Thus, the cement slurry may comprise, by total weight of portland cement, calcium sulfate hemihydrate, and water: from about 5 to about 9 percent calcium sulfate hemihydrate, from about 51 to about 65 percent portland cement, and about 30 to about 40 percent water. If desired, the slurry may contain other functional additives for their known purposes, in amounts which do not destroy the thixotropy of the slurry. For example, it is frequently desirable to employ an effective amount of calcium chloride as an accelerator. A commercially available source of calcium chloride used in the well service industry is calcium chloride flake having an assay of about 77–80% $CaCl_2$; the preferred thixotropic cement slurry employed in the present invention may include up to about 4 parts by weight of such calcium chloride flake (about 3.1% $CaCl_2$) per 100 parts portland cement, preferably about 1 to about 3 parts flake (0.77–2.4% $CaCl_2$) per 100 parts by weight portland cement.

Other thixotropic well cementing slurries which are substantially free of an effective amount of a fluid loss additive may be employed in the present invention, provided the slurries are compatible with the spacer fluid. Compatibility can readily be determined by conventional laboratory thickening time and compressive strength tests. Those skilled in the art will be able to select other thixotropic cement slurries as may be desired, by review of U.S. patents classified in Class 166, Subclasses 292 and 293 (October, 1975 class revision).

B. Spacer Fluid

The spacer fluid employed in the present invention is compatible with a broad range of drilling muds, including aqueous (brine or fresh water) based, oil based, and emulsion muds, up to temperatures of at least about 300° F. Preferably, the invention is practiced in conjunction with aqueous based muds or oil-in-water emulsion muds. Muds, however, do vary considerably; hence it is recommended that the spacer-mud compatibility be verified prior to use with a given mud. For example, occasional instances of incompatibility have been found with certain low density, untreated muds, having such a high viscosity that they themselves are nearly non-pumpable. The spacer may be used with such muds if the mud is first pre-treated with a chemical wash.

The water employed in the spacer may be fresh water or brine. Polyvalent metal cations in the water supply may furnish a portion or all of the polyvalent metal cation component necessary for the practice of the invention.

Water soluble silicates which can be employed in the spacer include alkali metal silicates in both anydrous and hydrated forms, e.g., ortho-, sesqui- and meta- silicates. General references on water soluble silicates are Vail, *Soluble Silicates, Their Properties and Uses*, Reinhold Publishing Co. (1952); Iler, *The Colloid Chemistry of Silica and Silicates;* and Vail, *Soluble Silicates in Industry*, The Chemical Catalog Co. (1928); the teachings of each of which are incorporated herein. Specific silicates which can be employed include, for example, lithium, sodium and potassium silicates. Specific silicate compounds which are useful are anhydrous sodium meta-silicate ($Na_2SiO_3$), hydrous sodium meta-silicate ($Na_2SiO_3.9H_2O$), sodium ortho-silicate ($Na_4SiO_4$), and corresponding lithium and potassium compounds.

Water soluble metal compounds which can be employed include, for example, certain water soluble oxides, salts (e.g., acetates, halides, nitrates or sulfates) and hydroxides of multivalent metal cations. Water soluble compounds of such metals as alkaline earth metals, aluminum, copper, zinc, iron, and chromium, are exemplary of suitable compounds. The metal compound should be soluble in water to the extent of at least about 0.01 percent by weight at a temperature of 60° F. Most preferred is calcium chloride, which is highly soluble as contrasted to, for example, calcium oxide.

Certain combinations of water soluble metal compounds when employed with water soluble silicates are more effective in the practice of the invention than are certain other combinations. Therefore, in any particular application preliminary evaluation of specific water soluble multivalent metal compounds with specific water soluble silicates should preferably be made to determine the most effective combination. For example, it appears that water soluble metal compounds wherein the metal is divalent form gels quicker and better than do compounds containing trivalent cations and thus the divalent compounds are preferred when such properties are desired. Moreover, calcium compounds appear to be preferred when anhydrous sodium meta-silicate is employed. Calcium chloride, calcium acetate and cupric chloride are preferred with hydrous sodium meta-silicate, with calcium chloride being most preferred. Calcium chloride is preferred with sodium ortho-silicate.

Where both the silicate and the polyvalent metal cation releasing compound are provided in particulate form, the silicate is more easily dispersed and dissolved in the water if the polyvalent metal cation releasing compound is added to the water prior to or concurrently with the silicate.

The silicate and the polyvalent metal cation releasing compound are provided in the water in amounts so that they cooperate to form a pumpable gel. Those skilled in the art recognize that a gel is not pumpable if it develops more than about 30 Uc before being drawn into the pump inlet, or more than about 70 Uc downstream from the pump. Generally, the water soluble silicate (calculated on an anhydrous basis) is provided in an amount of from about 0.1 to about 5 weight percent of the water, preferably 0.5 to about 3 percent, and the water soluble metal compound is provided in an amount sufficient to release for reaction with the silicate, from about 30 to about 130 percent of the molar equivalents of the polyvalent metal cation theoretically necessary to replace the alkali metal cation of the water soluble alkali metal silicate, e.g., about 0.3–1.3 moles of $Ca^{++}$ per mole of sodium metasilicate. Preferably, the metal compound releases from about 70 to about 100 percent of the stoichiometric amount of the metal cation. To obtain an adequate gel within a practical amount of time, appropriate allowance should be made where the metal compound dissolves slowly or is of low solubility. For example, whereas an optimum of about 1 mole of calcium chloride is employed per mole of sodium metasilicate, an amount in excess of 2 moles is optimum where calcium oxide, calcium sulfate dihydrate, and the like are employed. While it is possible to practice the essence of the invention somewhat outside the foregoing ranges, there is rarely an advantage in doing so. Lesser quantities are generally unsuitable because fluids having lesser quantities of silicate and polyvalent metal cation do not normally have desirable solids suspending properties. Excessive amounts of silicate, with a proportionately large amount of polyvalent metal cation, result in fluids difficult to pump. Disproportionately large amounts of polyvalent metal cation can react adversely with the mud, e.g., by severely thickening the mud.

To provide fluid loss control, the composition contains an inert particulate and a water dispersible cellulose compound. The cellulose compound may be an alkyl cellulose (e.g., methylcellulose), a carboxyalkyl cellulose (e.g., carboxymethylcellulose), a carboxyalkyl hydroxyalkyl cellulose such as carboxymethylhydroxyethyl cellulose, a hydroxyalkyl cellulose such as hydroxymethyl cellulose, and the like. Carboxymethyl cellulose is preferred for economic reasons. Use of starches, natural gums such as galactomannans and their derivatives, and polyacrylamides is to be avoided. They are generally not suitable for use herein since they frequently give compositions having poor compatibility with many drilling muds.

Particulate materials suitable for use in providing fluid loss control in cooperation with the cellulose compound are well known. Suitable materials include, powdered silica materials such as silica flour, natural pozzolans, fly ash, diatomaceous earth and other water inert powders such as calcium carbonate, barium sulfate, talc, and the like. Preferably, the particulate has a particle size diameter within the range of from about 1 to about 100 microns.

The cellulose compound and inert particulate are employed in amounts such that together they cooperate to give the desired measure of fluid loss control. The cellulose compound is preferably present in an amount of from about 0.5 to about 1.5 percent, by weight of water, and most preferably from about 0.75 to about 1.25 percent. Little fluid loss control is obtained using less than 0.5 percent, while more than 1.5 percent can result in loss of temperature stability, excessive cement retardation, and destruction of the thixotropy of the cement. Only slight fluid loss improvement is realized between 1.25 and 1.5 percent, and the risk of adverse effects is greater at the higher concentration. The particulate may be employed in amounts ranging from about 1 to about 100 percent, by weight of water, though those skilled in the art will realize that the solids carrying capacity of the fluid should not be exceeded in any particular embodiment. Preferably, from about 5 to 15 percent particulate is employed; fluid loss control obtained with greater amounts of particulate is not significantly better than that obtained with about 15 percent particulate. In a most preferred embodiment, about 1 percent carboxymethyl cellulose is employed together with about 10 percent silica flour which passes through a 200 mesh screen, U.S. Sieve Series.

Optionally, the spacer composition contains a weak sequestering agent for polyvalent metal cations in an amount of up to about 2 percent by weight of the water, particularly where the spacer is used to separate drilling mud from the cement. By "weak sequestering agent" is meant an agent which will chelate or precipitate polyvalent metal cations in the substantial absence of unreacted sites on the silicate, but which will not prevent reaction of polyvalent metal cations with the silicate so long as a reaction would otherwise occur between the silicate and the cation but for the presence of the sequestering agent. Thus, the purpose of the sequestering agent is to act as a scavenger for any excess polyvalent metal cations which could flocculate the drilling mud. The weak sequestering agent, however, does not significantly affect the reaction of the polyvalent metal cations with the silicate. Suitable sequestering agents for this purpose include citric acid, alkali metal citrates, alkali metal hexametaphosphates, alkali metal tetraphosphates, alkali metal bicarbonates, sodium acid pyrophosphate, and the like. Most preferably, about 1 percent sodium citrate dihydrate is employed, by weight of water.

The spacer may also contain weighting material to provide a desired density, e.g., up to about 20 lbs/gallon. Preferably, the spacer is designed to have at least as great a density, gel strength, and viscosity as that of the drilling fluid, under conditions present in the borehole, but it should have a density less than that of the cement. The weighting material can also affect gel strength and viscosity of the spacer to some extent. For example, weighting material having a small particle size tends to increase the apparent viscosity and gel strength of the spacer. Suitable materials include density increasing solids such as barium sulfate, fly ash, pozzolan, hematite, ilmenite, silica, and the like. Depending on the density of the materials, certain particulate materials used as fluid loss control agents may also serve as weighting materials, and where such particulates are present in an amount greater than about 15 percent BWOW, the excess over about 15 percent may be regarded as functioning principally as a weighting agent and only secondarily as further contributing to fluid loss control obtained with amounts of particulate less than about 15 percent.

As those skilled in the art will realize, the amount of weighting agent to be employed will vary greatly depending on the material used as a weighting agent, the desired weight of the slurry, and the like. For example, if 50 pounds of a blend comprised of, by weight, about 13.2% sodium metasilicate, 14.4% commercial calcium chloride flake containing 77–80 weight percent active $CaCl_2$, 6.6% carboxymethylcellulose, 6.6% sodium citrate dihydrate, and about 60% ground silica is added to 39.3 gallons of water, one 42-gallon barrel of 9 pounds per gallon spacer will be obtained. If a spacer of greater density is desired, the amount of weighting material to be added to the above mentioned 50-pound blend is calculated by the formula $$P = \frac{42D - 378}{1 - VD} \text{ where}$$

P = pounds of weighting material
D = the desired density in pounds per gallon
and
V = the absolute volume of the weighting material in gallons per pound.

Thus, by adding 297 pounds of fly ash (absolute volume = 0.048 gal/lb) to the foregoing, a 12 lb/gal spacer is obtained. Similarly, a 19 lb/gal spacer is obtained by adding about 780 pounds of hematite to the basic formulation initially described in this paragraph.

The spacer may also include other materials for their known purposes, such as kolite, gilsonite, cellophane flakes, and the like for lost circulation control, provided they do not render the spacer incompatible with the mud or the cement. Minor amounts of an antifoaming agent may be included to provide better mixing properties, e.g., up to about 1 percent by weight of water. Excessive amounts of antifoaming agent hinder gel formation. Where a formation is present which is sensitive to fresh water, such as certain shales or clay containing sandstone, a salt such as an alkali metal halide may be incorporated in the spacer.

In practicing the present invention the spacer is injected by conventional techniques, e.g., preferably down the casing to drive the mud up and out of the borehole via the annulus, though the spacer may also be injected down the annulus to drive the mud up the inside of the casing if desired. A sufficient quantity of spacer is employed to separate the mud from the cement, and to maintain an uncontaminated zone of spacer between the leading and trailing portions of the spacer which may become somewhat contaminated with the leading or trailing fluids, respectively. It is recommended that sufficient spacer be employed to separate the leading fluid from the trailing fluid by at least about 200 feet, and preferably at least about 500 feet, calculated on the basis of the average cross sectional area of the annulus, although lesser volumes of spacer may be employed depending on the nature of the fluids being separated and the extent to which it is desired to reduce the fluid loss of the thixotropic slurry.

V. EXAMPLES AND COMPARISON RUNS

The Examples and Comparison Runs in Ser. No. 766,835 are expressly incorporated herein. (A photocopy of pages 18–34 of said application, which contain the incorporated examples and comparison runs, is being filed herewith, and thus will become available as part of the file wrapper of the instant application.)

The following tests run on 1 × 1 inch cylindrical water saturated cores of Berea sandstone demonstrate that use of the spacer effectively reduces the fluid loss of thixotropic cements.

A thixotropic cement system was prepared by admixing Class A portland cement, and by weight of portland cement, 12 percent $CaSO_4 \cdot \frac{1}{2}H_2O$, 3 percent calcium chloride flake (77–80% assay $CaCl_2$), and 60 percent water. The slurry was admixed at 80° F for 20 minutes before testing.

A spacer fluid, designated A, was prepared by admixing water and, BWOW, 2 percent sodium metasilicate, 2.2 percent calcium chloride flake, 1 percent carboxymethylcellulose, and 9 percent silica having an average particle size of less than about 200 mesh. Spacer fluid B also contained 1 percent BWOW sodium citrate dihydrate.

The spacer fluid was charged to a fluid loss core test cell and a pressure of 1000 psi applied for the time indicated in Table I which follows, whereupon the test cell was opened and excess spacer removed. The thixotropic cement slurry was then charged to the test cell, and fluid loss determined. Results were as follows:

TABLE I

| | | | Spacer Fluid Loss[1] | | | Cement Fluid Loss[1] | | |
|---|---|---|---|---|---|---|---|---|
| Run | Original Permeability md | Spacer Material | Volume ml | Time min. | API Fluid Loss ml/30 min[2] | Volume ml | Time min. | API Fluid Loss ml/30 min[2] |
| Comparison 1 | ND[3] | None | — | — | — | 25 | 3 | 711 |
| Comparison 2 | 18 | None | — | — | — | 18 | 2 | 627 |
| Comparison 3 | 76 | None | — | — | — | 10 | 1 | 493 |
| Comparison 4 | 60 | None | — | — | — | 12 | 2 | 418 |
| Example 1 | ND | B | 2 | 5 | 44 | 4 | 15 | 51 |
| Example 2 | 47 | B | 1 | 5 | 22 | 5 | 15 | 64 |
| Example 3 | ND | A | 5 | 16 | 62 | 3 | 15 | 38 |
| Example 4[4] | ND | A | 4 | 13 | 55 | 3 | 17 | 36 |
| Example 5[5] | ND | B | 3 | 9 | 49 | 8 | 15 | 102 |

Notes:
[1] At 80° F except as otherwise noted.
[2] API RB10B Formula 8.1 times a factor of 9--area of core 1/9 that of standard screen.
[3] Not determined.
[4] At 140° F.
[5] At 200° F.

What is claimed is:

1. A method of reducing fluid loss from a thixotropic cement slurry to a subterranean formation during emplacement of said slurry in a borehole which penetrates the subterranean formation to cement a conduit in said borehole, said cement slurry being substantially free of an effective amount of a fluid loss additive, comprising:
    (a) temporarily positioning the conduit in the borehole;
    (b) providing a fluid comprised of water, a water soluble alkali metal silicate, a water soluble metal compound capable of releasing a multivalent metal cation to react with the water soluble silicate, and a water dispersible cellulose compound and an inert particulate which together impart fluid loss control to the fluid, said fluid components being provided in amounts effective to form a pumpable gel;
    (c) injecting said fluid into said borehole so that at least a portion of said fluid contacts the walls of the formation;
    (d) injecting said thixotropic cement slurry into said borehole following said fluid and circulating said slurry into position; and
    (e) permitting said slurry to set, thereby permanently cementing said conduit into position; the quantity of said fluid contacting said formation being sufficient so that the fluid loss of said cement slurry to said formation is reduced.

2. The method of claim 1 wherein said cellulose compound is present in an amount of from about 0.5 to about 1.5 percent BWOW, and said fluid loss control-providing particulate is present in an amount of from about 1 to about 100 percent BWOW.

3. The method of claim 2 wherein the amounts of cellulose compound and said fluid loss control-providing particulate present in said fluid are from about 0.75–1.25 and 5–15 percent, respectively, BWOW.

4. The method of claim 3 wherein said silicate is present in an amount of from about 0.1–5 percent BWOW, and the metal compound is present in an amount sufficient to release from about 30–130 percent of the molar equivalents of the polyvalent metal cation stoichiometrically required to react with the alkali metal silicate.

5. The method of claim 4 wherein the amounts of cellulose compound and said fluid loss control-providing particulate present in said fluid are from about 0.75–1.25 and 5–15 percent, respectively, BWOW.

6. The method of claim 4 wherein the silicate is present in an amount of from about 0.5–3 percent BWOW, and the metal compound is present in an amount sufficient to release from about 70–100 percent of the polyvalent metal cation stoichiometrically required to react with the silicate.

7. The method of claim 3 wherein the fluid is prepared from water and:
    from about 0.1–5 percent BWOW alkali metal silicate;
    the metal compound in an amount sufficient to release from about 30 to about 130 percent of the molar equivalents of the polyvalent metal cation stoichiometrically required to react with alkali metal silicate;
    from about 0.5–1.5 percent BWOW the cellulose compound; and
    from about 1–100 percent BWOW fluid loss control providing particulate having a particle size diameter of from about 1 to 100 microns.

8. The method of claim 7 wherein the spacer also contains a weak sequestering agent for polyvalent metal cations, in an amount up to about 2 percent, BWOW.

9. The method of claim 8 wherein the spacer also includes a material for preventing lost circulation.

10. The method of claim 9 wherein said borehole initially contains a drilling mud, and steps (c) and (d) are carried out so that the drilling mud is displaced from the portion of the borehole to be cemented.

11. The method of claim 10 wherein the cement has a density greater than the mud and the fluid is prepared from components including water and:
   anhydrous sodium metasilicate, about 0.1-5 percent, BWOW;
   calcium chloride in an amount sufficient to provide from about 0.3 to about 1.3 moles $Ca^{++}$ per mole of sodium metasilicate;
   carboxymethyl cellulose, about 0.5-1.5 percent, BWOW;
   silica flour having a particle size diameter of from about 1 micron to about 100 microns, about 1-100 percent, BWOW;
   a weak sequestering agent selected from the group consisting of citric acid, alkali metal citrates, alkali metal hexametaphosphates, alkali metal tetraphosphates, alkali metal bicarbonates, and sodium acid pyrophosphate, in an amount up to about 2 percent BWOW; and
   a weighting agent effective to adjust the density of the spacer to greater than that of the mud but less than that of the cement.

12. The method of claim 11 wherein the following amounts of the respective components are employed in the preparation of the fluid:
   anhydrous sodium metasilicate, about 0.5-3 percent BWOW;
   calcium chloride in an amount sufficient to provide from about 0.7-1 mole $Ca^{++}$ per mole of sodium metasilicate;
   carboxymethyl cellulose, about 0.75-1.25 percent, BWOW;
   silica flour, about 5-15 percent BWOW; and
   sodium citrate dihydrate, about 1 percent BWOW.

13. The method of claim 3 wherein the silicate is sodium metasilicate.

14. The method of claim 13 wherein the metal compound is selected from the group consisting of the water soluble oxides, salts, and hydroxides of alkaline earth metals, aluminum, calcium, copper, zinc, iron, and chromium.

15. The method of claim 14 wherein the metal compound provides $Ca^{++}$.

16. The method of claim 15 wherein the metal compound is calcium chloride.

17. The method of claim 1 wherein the cement slurry comprises, by weight:
   (a) from about 5-9 percent calcium sulfate hemihydrate;
   (b) from about 51-65 percent portland cement, and
   (c) the balance substantially water or brine to make a total of 100 percent.

18. The method of claim 17 wherein said cellulose compound is present in an amount of from about 0.5 to about 1.5 percent BWOW, and said fluid loss control-providing particulate is present in an amount of from about 1 to about 100 percent BWOW.

19. The method of claim 1 wherein said borehole initially contains a drilling mud, and steps (c) and (d) are carried out so that the drilling mud is displaced from the portion of the borehole to be cemented.

* * * * *